United States Patent [19]
Puech

[11] 3,945,790
[45] Mar. 23, 1976

[54] PRESSING DEVICE FOR MANUFACTURING OF STORAGE SUBSTRATES

[75] Inventor: Claude Puech, Paris, France

[73] Assignee: Thomson-CSF, Paris, France

[22] Filed: Dec. 4, 1973

[21] Appl. No.: 421,715

[30] Foreign Application Priority Data
Dec. 8, 1972   France .................... 72.43739

[52] U.S. Cl. ............... 425/385; 425/383; 425/406; 425/411; 425/810; 264/107
[51] Int. Cl.² .................................................. B29C 3/00
[58] Field of Search .......... 425/385, 810, 406, 394, 425/411, 383; 264/107

[56] References Cited
UNITED STATES PATENTS

| | | | |
|---|---|---|---|
| 2,609,568 | 9/1952 | Getchell | 425/385 X |
| 2,985,910 | 5/1961 | Van Houten | 425/385 |
| 3,019,482 | 2/1962 | Van Houten | 425/385 |
| 3,052,586 | 9/1962 | Brown | 264/107 X |
| 3,072,519 | 1/1963 | Salzman | 264/107 X |
| 3,534,440 | 10/1970 | Roberts | 425/385 X |
| 3,737,276 | 6/1973 | Hill et al. | 425/388 |

Primary Examiner—Robert L. Spicer, Jr.
Attorney, Agent, or Firm—Cushman, Darby & Cushman

[57] ABSTRACT

A device for pressing storage substrates made of thermoplastic material. It comprises: a press having two plates, a matrix attached to one of the plates, the matrix carrying the data to be stored in said substrate, and, arranged between the plates, one rubber sheet, on polyethyleneterephtalate sheet and a metal film. The superimposition of these different materials ensuring a properly uniform pressure over the substrate.

13 Claims, 4 Drawing Figures

PRESSING DEVICE FOR MANUFACTURING OF STORAGE SUBSTRATES

Various methods have been developed to make it possible to record video frequency data, so that black and white or colour television programmes, with several sound tracks, can be stored.

The data or information is recorded in the form of a micro-relief structure cut in the surface of a transparent or reflective material. This micro-relief structure typically takes the form of holes whose diameters may vary from a fraction of a micron to some few microns, and whose depths are less than one micron.

The initial recording of the video frequency signals is carried out in a material chosen in order to make it possible to monitor the size of the holes which have been hollowed out by an optical method, or by an electron beam or again mechanically using known methods. This initial recording is then used, for instance with the help of a galvanoplastic technique, to create metal matrices which make it possible to reproduce in a thermoplastic material, the microrelief structure thus created, this in the form of numerous examples.

Those of the devices for reading out the recordings thus effected upon a thermoplastic material, which utilise automatic aerodynamic stabilisation of said material, requires that said material should have excellent parallelism upon the part of its faces and should not exhibit any high spots either on the face carrying the impression of the microrelief structure or upon the opposite face. Hitherto, this has been impossible of achievement, due to the "flow" phenomenon occurring, during the pressing operation, in the plastic materials utilised.

The pressing device which forms the subject of the present invention makes it possible to achieve excellent quality recordings of video frequency signals upon thermoplastic substrates.

In accordance with the invention, there is provided a device for pressing thermoplastic material, designed to transfer to said thermoplastic material an impression carried by a rigid matrix, and comprising: a press having two rigid, parallel plates, said matrix being attached to the first of said plates; heater means designed to raise said thermoplastic material to its impression temperature; means for uniformly distributing a pressure over the whole surface of said thermoplastic material, arranged between said thermoplastic material and the second of said plates, thus preventing any transverse displacements of said thermoplastic material during the pressing operation.

For a better understanding of the invention and to show how the same may be carried into effect, reference will be made to the following description and the attached figures, among which:

FIG. 1 illustrates an embodiment of the pressing device in accordance with the invention;

FIG. 2, in section, illustrates a composite material which can be associated with one of the plates of the press, forming part of the device in accordance with the invention;

Figure 1:
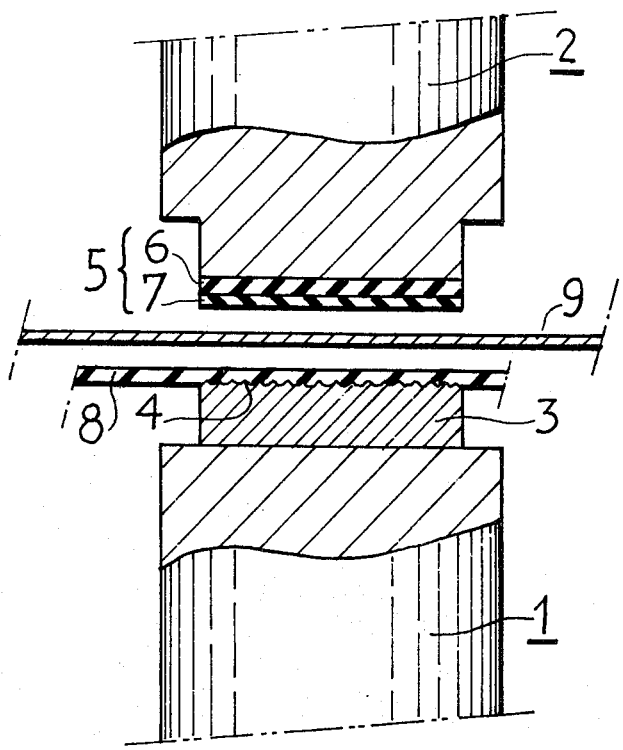
Figure 2:
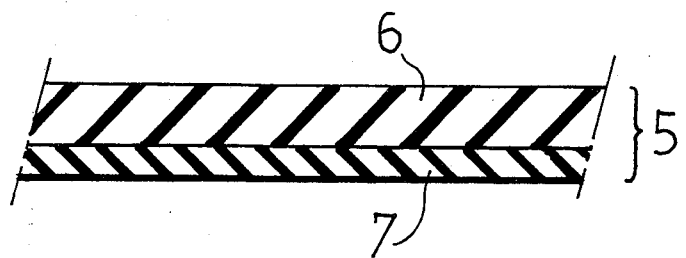

The pressing device shown in FIG. 1, comprises a press with two plates 1 and 2 respectively fitted with a matrix or die 3, whose surface carries a micro-relief structure 4, and a composite material 5 illustrates in section in FIG. 2. This composite material 5 comprises a plate 6 of elastomeric material, for example neoprene, and a sheet 7 of a film of flexible material having a good resistance to stretching and a softening temperature in excess of the pressing temperature of the thermoplastic material 8 used as storage substrate; this sheet 7 can advantageously be made of polyethyleneterephtalate, marketed under the trade name "MYLAR," or "TERPHANE." In order, at the instant of pressing, to prevent the "MYLAR" 7 from exhibiting the flow phenomenon and therefore a similar phenomenon in the thermoplastic material 8 as a consequence, a metal film 9, for example of aluminium, is arranged between the "MYLAR" sheet 7 and the thermoplastic material 8 (FIG. 1). A particular embodiment consists in attaching the metal film 9 to the layer of MYLAR 7, the assembly 7-9 being fixed on the elastomeric plate 6 which itself is fixed to a plate of the press, for example the plate 2 on the figure.

Figure 3:
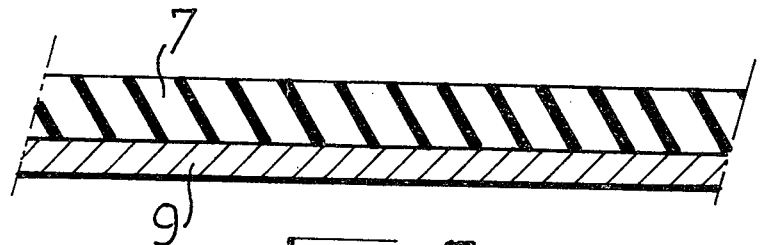
FIG. 3 illustrates a material which can be utilised in the device in accordance with the invention.

In another embodiment (FIG. 3), the metal film 9 is deposited on the layer 7, then taking the form of a strip, both material 7 and 9 thus constituting a single film of flexible material which can easily be renewed at each pressing operation.

Figure 4:
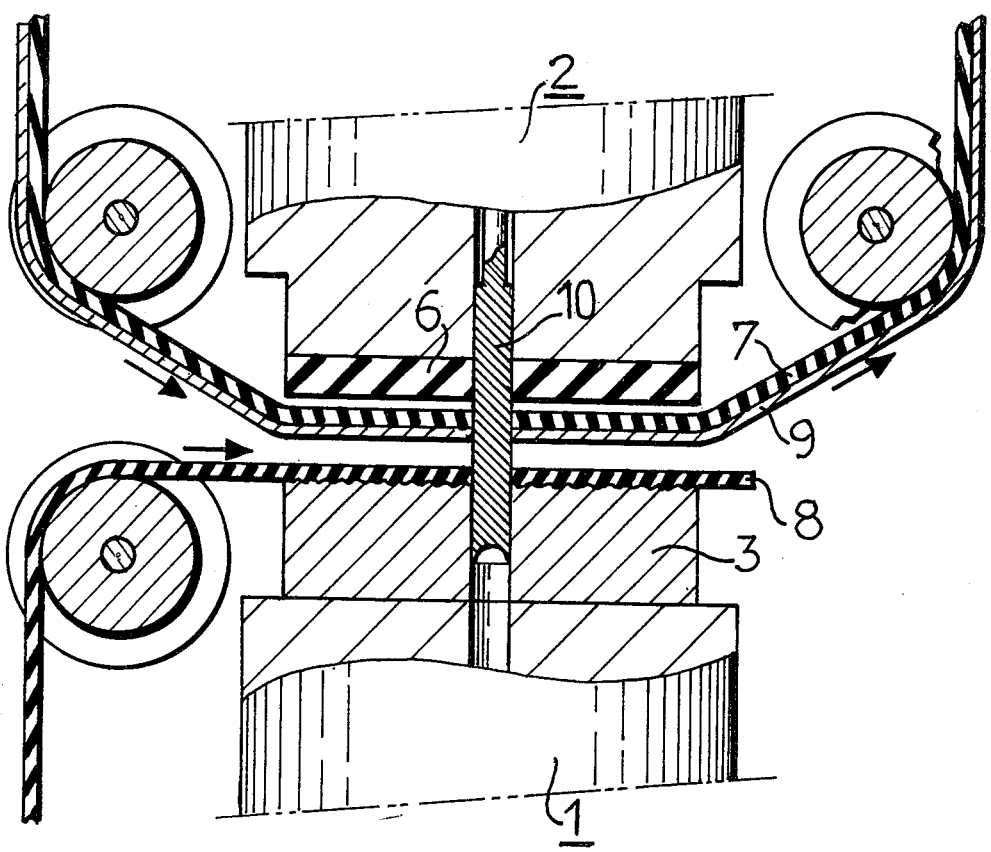
FIG. 4 illustrates another embodiment of a pressing device in accordance with the invention.

In this case, the pressing device can be designed in the manner shown in FIG. 4. The thermoplastic material 8 which is this embodiment can equally well take the form of a strip or band, is introduced into the press at the same time as the "MYLAR" layer 7, on which there has previously been deposited a metal film 9. The device of the invention further comprises heater means which can take the form of an electrical resistor arranged in the plate 2, or of a hot fluid circulating through said plate 2, as shown for example on FIG. 1 illustrating a hot fluid coil positioned near the inner surface 12 of the plate 2, in the form of a spiral. It can preferably take the form of a contact system for passing an electric current through that portion of the aluminium film 9 which is in contact with the thermoplastic material 8 at the instant of pressing as shown for example on FIG. 4, where two movable contacts 13 and 14, or brushes, are illustrated which apply on the aluminum film 9 and are connected to two terminals A and B respectively, a voltage source (not shown) for applying a potential difference between A and B being further provided. At this instant, said heater means make it possible to raise the temperature of the thermoplastic material 8 to its softening point.

Said thermoplastic material 8 can also be subjected to a preheating operation before being introduced into the press so that the pressing rate can be increased.

At the instant of pressing, the thermoplastic material 8, for example polyvinylchloride, is raised to its impression temperature (about 80° C). This thermoplastic material 8 is then subjected to the desired pressure (10 to 50 Kg/cm$^2$).

The association of the neoprene plate 6, the polyethyleneterephthalate sheet 7 and the aluminium film 9 makes it possible to apply a really uniform pressure over the whole of the surface of the thermoplastic material 8 at the instant of pressing, and also makes it possible to prevent the "flow" phenomenon, and certain impression defects which are due to the poor condition of the rear surface of the matrix 3.

When the impression has been made, the temperature of the thermoplastic material 8 is reduced to the gelling temperature (substantially equal to 50° C for polyvinylchloride) whilst maintaining the pressure. Release from the mould is then effected. The requisite holes for driving the recording substrate through the pick-up system, said substrate taking the form of a disc for example, can be produced by means of a punch 10 as shown in FIG. 4. In the same way, the cutting of said disc to the desired size can be effected in the press, after the pressing operation, when the disc has reached its gelling temperature.

Self-evidently, the pressing device utilised to implement the method in accordance with the invention, may exhibit various embodiments. The metal film 9 may, for example, be separate from the sheet or strip of "MYLAR" 7. In this case, it will pass between the plates of the press before each pressing operation, as also can the thermoplastic material if it too takes the form of a strip or band.

What I claim is:

1. A device for pressing thermoplastic material, designed to transfer to said thermoplastic material an impression carried by a rigid matrix, and comprising: a press having two rigid, first and second parallel plates, said matrix being attached to the first of said plates; heater means designed to raise said thermoplastic material to its impression temperature; means for uniformly distributing a pressure over the whole surface of said thermoplastic material, arranged between said thermoplastic material and the second of said plates, thus preventing any transverse displacements of said thermoplastic material during the pressing operation.

2. A pressing device as claimed in claim 1, wherein said uniform pressure distribution means comprise an elastomeric plate located opposite said second plate and associated with at least one film of flexible material having a high resistance to stretching and a softening temperature in excess of the pressing temperature of said thermoplastic material.

3. A pressing device as claimed in claim 2, wherein the material of said film is polyethyleneterephthalate.

4. A pressing device as claimed in claim 2, wherein said film is constituted by a composite material formed by a layer of polyethyleneterephthalate upon which a metal film has been deposited.

5. A pressing device as claimed in claim 4, wherein said metal film is an aluminium film.

6. A pressing device as claimed in claim 2, wherein said elastomeric plate is attached to said second plate of the press.

7. A pressing device as claimed in claim 6, wherein said film is fixed to said elastomeric plate.

8. A pressing device as claimed in claim 4, wherein said film is attached to said elastomeric plate; the latter being fixed to said second plate.

9. A pressing device as claimed in claim 2, wherein a first and second film of flexible material are associated with said elastomeric plate, these films being located between the two plates of the press during the operation of pressing said thermoplastic material, and means being provided in order to introduce said films between said press plates.

10. A pressing device as claimed in claim 9, wherein said first film is made of polyethyleneterephthalate and said second film a metal film.

11. A pressing device as claimed in claim 4, wherein said heater means are associated with said metal film, said heating means comprising a system of electrical contacts which make it possible to apply a potential difference between two opposite edges of said metal film.

12. A pressing device as claimed in claim 10, wherein said heating means are associated with said metal film, said means comprising a system of electrical contacts which make it possible to apply a potential difference between two opposite edges of said metal film.

13. A pressing device as claimed in claim 1, further comprising means for preheating said thermoplastic material, associated with said press.

* * * * *